US005621824A

United States Patent [19]
Ijiri et al.

[11] Patent Number: 5,621,824
[45] Date of Patent: Apr. 15, 1997

[54] SHADING CORRECTION METHOD, AND APPARATUS THEREFOR

[75] Inventors: Takashi Ijiri; Toshihiko Matsumoto; Toshimichi Masaki; Naoshi Awano; Osamu Motooka, all of Kyoto, Japan

[73] Assignee: Omron Corporation, Japan

[21] Appl. No.: 70,360

[22] PCT Filed: Nov. 29, 1991

[86] PCT No.: PCT/JP91/01664

§ 371 Date: Jun. 1, 1993

§ 102(e) Date: Jun. 1, 1993

[87] PCT Pub. No.: WO92/10810

PCT Pub. Date: Jun. 26, 1992

[30] Foreign Application Priority Data

Dec. 6, 1990 [JP] Japan ................................. 2-407404

[51] Int. Cl.⁶ ................................................ G06K 9/40
[52] U.S. Cl. ........................... 382/274; 382/108; 348/251
[58] Field of Search ........................... 382/8, 25, 54, 382/108, 274; 358/106, 163, 461; 395/126; 356/237, 376; 250/223 B, 560; 348/86, 251; H04N 5/228

[56] References Cited

U.S. PATENT DOCUMENTS

| | | | |
|---|---|---|---|
| 4,472,736 | 9/1984 | Ushio et al. | 382/50 |
| 4,655,349 | 4/1987 | Joseph et al. | 250/223 B |
| 4,679,075 | 7/1987 | Williams et al. | 358/106 |
| 4,691,231 | 9/1987 | Fitzmorris et al. | 250/223 B |
| 4,747,148 | 5/1988 | Watanabe et al. | 382/8 |
| 4,851,913 | 7/1989 | Fetzer et al. | 348/86 |
| 4,920,572 | 4/1990 | Sugita et al. | 382/25 |
| 5,059,031 | 10/1991 | Hamel et al. | 250/223 B |
| 5,187,573 | 2/1993 | Yoshida | 250/223 B |

FOREIGN PATENT DOCUMENTS

| | | |
|---|---|---|
| 58-23964 | 6/1982 | Japan . |
| 6376566 | 9/1986 | Japan . |
| 2217968 | 8/1990 | Japan . |

OTHER PUBLICATIONS

Xian et al, "Automatic Visual Inspection of the Surface ... " 1990, pp. 1490–1494.

*Primary Examiner*—Leo Boudreau
*Assistant Examiner*—Chris Kelley
*Attorney, Agent, or Firm*—Dickstein Shapiro Morin & Oshinsky LLP

[57] ABSTRACT

An image obtained by imaging an object having a solid shape, such as that of a circular column or prism, develops a distribution in brightness since the angle of each portion of the surface of the object with respect to a lighting device and image pick-up device differs depending upon the location. The distribution of brightness is substantially uniform along the longitudinal direction of the object but varies transversely of the object. One line is designated on the captured image of the object in a direction that cuts across the object, and the distribution of brightness on this line is obtained. A two-dimensional shading pattern is obtained by expanding this brightness distribution in the longitudinal direction of the object. The shading pattern represents the distribution of the brightness in the image of the surface of the object. Accordingly, a shading correction is performed by subtracting the shading pattern data from the image data of the object, and the distribution of brightness caused by the solid shape of the object is eliminated.

10 Claims, 11 Drawing Sheets

Fig. 19
| P1 | P2 | P3 |
|----|----|----|
| P4 | P0 | P5 |
| P6 | P7 | P8 |
Fig. 20
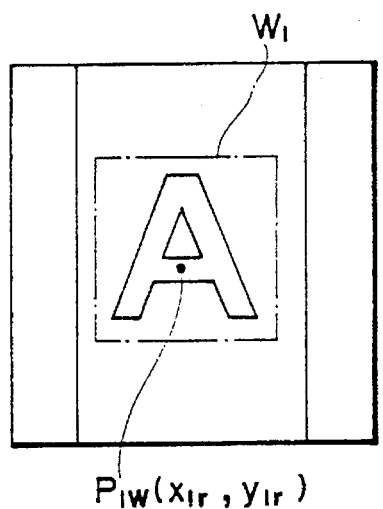
Fig. 21
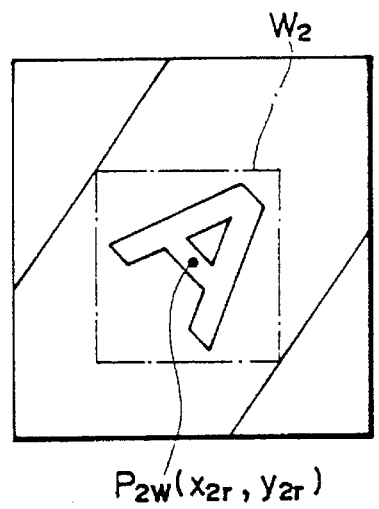
Fig. 22
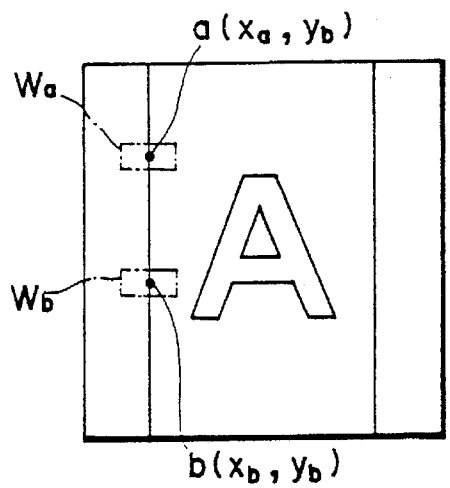
Fig. 23
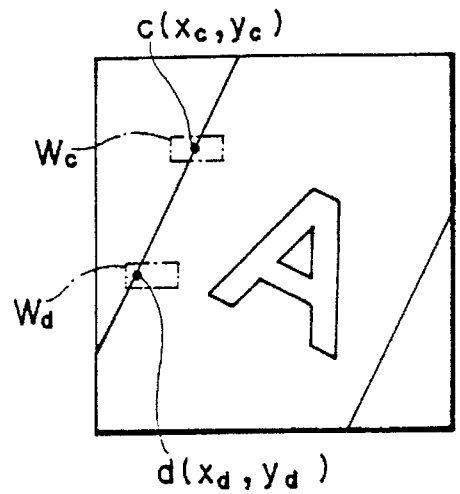

SHADING CORRECTION METHOD, AND APPARATUS THEREFOR

TECHNICAL FIELD

This invention relates to a shading correction (compensation) method, and an apparatus therefor, in which effects ascribed to lighting irregularity, the shadows of an object, etc., are eliminated. More particularly, the invention relates to a shading correction (compensation) method, and an apparatus therefor, ideal for columnar objects such as circular cylinders, circular columns or prisms.

BACKGROUND ART

There are many cases in which shading processing, which is for eliminating a non-uniformity in brightness as caused by the lighting irregularity of a lighting device or distortion of a camera lens, is required as pre-processing for the reading of characters or for the recognition of other objects.

In conventional shading processing, a solid white reference paper having a uniform reflectivity is imaged and the resulting image is adopted as a shading pattern. When an object is imaged, a prescribed arithmetic operation (such as subtraction or division) is performed between image data indicative of the object and image data representing the shading pattern. Image data subjected to a shading correction by this operation is obtained.

With this conventional shading method, however, it is required that the reference paper be prepared in advance. Further, in a case where the object is a solid figure, such as a circular cylinder, the amount of light incident upon the image pick-up device differs depending upon the location of the object. This light is part of the illuminating light that has been reflected by the object. More specifically, most of the light reflected from the portion of the object facing the image pick-up device impinges upon the image pick-up device. However, at the side faces of the object or portions in the vicinity thereof, the illuminating light is not reflected toward the position of the image pick-up device. Most of this reflected light does not impinge upon the image pick-up device. Consequently, when an object having such a solid shape is photographed, the photographic image develops a shadow (meaning a portion that is comparatively dark). It is difficult to prevent such a variance in light and darkness with the conventional method using the aforesaid reference paper.

An object of the present invention is to provide a shading correction method, and an apparatus therefor, whereby it is possible to eliminate the effects of shadows, which are caused by solid shapes, without using a reference paper or the like.

Another object of the present invention is to make possible a correct shading correction even in a case where the position of an object to be imaged in the visual field of a camera has shifted from a reference position.

DISCLOSURE OF THE INVENTION

A shading correction method and apparatus according to a first aspect of the present invention are as follows:

A shading correction method according to a first aspect of the present invention comprises steps of imaging a columnar object using an image pick-up device to obtain image data representing the object, displaying the image represented by the image data on a display unit, designating, on the image displayed by the display unit, a sample location in linear form in a direction perpendicularly intersecting a longitudinal direction of the object, creating two-dimensional shading-pattern data by continuously arranging a density-level distribution, which is identical with that along the designated linear sample location, in the longitudinal direction of the object, and performing a shading correction of the image data representing the object by using the shading-pattern data.

In an embodiment of the invention, the sample location is designated by the position of a line drawn on the image or by a slender window displayed on the image.

The shading correction method according to the first aspect of the invention can also be expressed as comprising steps of extracting, from image data obtained by imaging an object, image data of a sample location designated in linear form on a displayed image of the object, creating two-dimensional shading-pattern data by arranging the extracted image data in a direction perpendicularly intersecting a longitudinal direction of the linear sample location, and performing a shading correction of the image data representing the object by using the shading-pattern data created. This method is expressed by focusing solely on the processing procedure of a processing unit that executes the shading correction.

A shading correction apparatus according to the first aspect of the present invention comprises an image pick-up device for imaging a columnar object and outputting image data representing the object, a display unit for displaying the image represented by the image data outputted by the image pick-up device, an input unit for designating, on the image displayed by the display unit, a sample location in linear form in a direction perpendicularly intersecting a longitudinal direction of the object, means for creating two-dimensional shading-pattern data by continuously arranging a density-level distribution, which is identical with that along the linear sample location designated through the input unit, in the longitudinal direction of the object, and means for performing a shading correction of the image data representing the object by using the shading-pattern data.

In a preferred embodiment, the shading correction apparatus has binarizing means for binarizing the image data after it has been subjected to the shading correction.

The designated linear sample location in the first aspect of the invention is designated as a location at which an image that contains the surface shadow of the object appears greatest in the captured image, and, moreover, at which characters, figures and the like written on the surface of the object do not appear. A two-dimensional shading pattern is created by expanding, in the longitudinal direction of the object, the image data of the sample location linearly designated in this manner. The created shading pattern correctly represents the distribution of light and darkness on the surface of the object resulting from the solid shape of the object. Accordingly, by performing a shading correction using this shading pattern, it is possible to eliminate the light-and-darkness distribution that appears in an image due to the solid shape thereof, and image data containing solely the characters and symbols, etc., on the object surface can be obtained. The reference paper used in the prior art is unnecessary.

Also provided are a method and apparatus for creating the shading pattern used in the shading correction method and apparatus according to the present invention.

This method of creating a shading pattern comprises steps of imaging a columnar object using an image pick-up device to obtain image data representing the object, displaying the image represented by the image data on a display unit, designating, on the image displayed by the display unit, a sample location in linear form in a direction perpendicularly intersecting a longitudinal direction of the object, and creating two-dimensional shading-pattern data by continuously arranging a density-level distribution, which is identical with that along the designated linear sample location, in the longitudinal direction of the object.

If attention is directed to the processing procedure in a case where the creation of the shading pattern is implemented by software, the method of creating a shading pattern comprises the steps of extracting, from captured image data of an object, image data of a sample location designated in linear form on a displayed image of the object, and creating two-dimensional shading-pattern data by arranging the extracted image data in a direction perpendicularly intersecting a longitudinal direction of the linear sample location.

An apparatus for creating a shading pattern comprises an image pick-up device for imaging a columnar object and outputting image data representing the object, a display unit for displaying the image represented by the image data outputted by the image pick-up device, an input unit for designating, on the image displayed by the display unit, a sample location in linear form in a direction perpendicularly intersecting a longitudinal direction of the object, and means for creating two-dimensional shading-pattern data by continuously arranging density-level distribution, which is identical with that along the linear sample location designated through the input unit, in the longitudinal direction of the object.

In accordance with this method and apparatus for creating a shading pattern, merely designating the sample location in linear form on the displayed image of the object makes it possible to create a shading pattern regarding the object.

A second aspect of the present invention is particularly effective in a case where a sample location cannot be designated in linear form across a columnar object as is done in the first aspect of the invention. For example, in a case where a character or figure is represented over the entire range of the object surface in the longitudinal direction thereof, the linear sample location cuts across the character or figure regardless of where the linear sample location is situated.

A shading correction method according to the second aspect of the present invention comprises the steps of imaging a columnar object using an image pick-up device to obtain image data representing the object, displaying the image represented by the image data on a display unit, designating, on the image displayed by the display unit, a plurality of representative points on lines on which density is regarded as being uniform across the entire length of the image of the object (with the exception of portions on which characters or figures are written), creating a density-level distribution by arranging the designated representative points in accordance with a coordinate axis perpendicularly intersecting a longitudinal direction of the object, creating two-dimensional shading-pattern data by continuously arranging a density-level distribution, which is identical with this density-level distribution, along the longitudinal direction of the object, and performing a shading correction of the image data representing the object by using the shading-pattern data.

If the shading correction method according to the second aspect of the invention is defined as a processing procedure based upon software, then the method comprises the steps of extracting, from captured image data of an object, image data of a plurality of sample points designated on a displayed image of the object, creating a density-level distribution by arranging the extracted image data along one axis of two rectangular coordinate axes, creating two-dimensional shading-pattern data by arranging this density-level distribution along the other axis of the two rectangular coordinate axes, and performing a shading correction of the image data representing the object by using the shading-pattern data created.

A shading correction apparatus according to the second aspect of the present invention comprises an image pick-up device for imaging a columnar object and outputting image data representing the object, a display unit for displaying the image represented by the image data outputted by the image pick-up device, an input unit for designating, on the image displayed by the display unit, a plurality of representative points on lines on which density is regarded as being uniform across the entire length of the image of the object (with the exception of portions on which characters or figures are written), means for creating a density-level distribution by arranging the representative points, which have been designated through the input unit, in accordance with a coordinate axis perpendicularly intersecting a longitudinal direction of the object, and creating two-dimensional shading-pattern data by continuously arranging a density-level distribution, which is identical with this density-level distribution, along the longitudinal direction of the object, and means for performing a shading correction of the image data representing the object by using the shading-pattern data.

In a preferred embodiment, the means for creating the shading-pattern data creates the continuous density level distribution by interpolating image data of the plurality of representative points designated.

In a preferred embodiment, binarizing means is provided for binarizing the image data after it has been subjected to the shading correction.

In the second aspect of the invention, sample locations are designated in the form of points rather than as a straight line. Each designated point is a representative point on a line regarded as having a uniform density level in the longitudinal direction of the columnar object with the exception of portions on which characters or figures are represented. These points are designated at locations other than those at which characters or figures are represented. By arranging the density levels of these points transversely of the columnar object, a density level distribution in the transverse direction is obtained. Therefore, if this density level distribution is expanded in the longitudinal direction, a two-dimensional shading pattern is obtained. The two-dimensional shading pattern represents the distribution of image brightness on the object surface in a case where it is assumed that there are no characters or figures on the object surface. By performing the shading correction using the shading pattern thus obtained, it is possible to eliminate the influence of the distribution of brightness arising from the solid shape of the object.

A method and apparatus for creating the shading pattern used in the second embodiment are also provided.

This method of creating a shading pattern comprises steps of imaging a columnar object using an image pick-up device to obtain image data representing the object, displaying the image represented by the image data on a display unit, designating, on the image displayed by the display unit, a plurality of representative points on lines on which density is regarded as being uniform across the entire length of the image of the object, creating a density-level distribution by arranging the designated representative points in accordance with a coordinate axis perpendicularly intersecting a longitudinal direction of the object, and creating two-dimensional shading-pattern data by continuously arranging a density-level distribution, which is identical with this density-level distribution, along the longitudinal direction of the image.

The method of creating a shading pattern may be defined as comprising the steps of extracting, from captured image data of an object, image data of a plurality of sample points designated on a displayed image of the object, creating a density-level distribution by arranging the extracted image data along one axis of two rectangular coordinate axes, and creating two-dimensional shading-pattern data by continuously arranging a density-level distribution, which is identical with this density-level distribution, along the other axis of the two rectangular coordinate axes.

An apparatus for creating a shading pattern comprises an image pick-up device for imaging a columnar object and outputting image data representing the object, a display unit for displaying the image represented by the image data outputted by the image pick-up device, an input unit for designating, on the image displayed by the display unit, a plurality of representative points on lines on which density is regarded as being uniform across the entire length of the image of the object, and means for creating a density-level distribution by arranging the representative points, which have been designated through the input unit, in accordance with a coordinate axis perpendicularly intersecting a longitudinal direction of the object, and creating two-dimensional shading-pattern data by continuously arranging the density-level distribution along the longitudinal direction of the object.

The method and apparatus for creating a shading pattern make it possible to create the shading pattern merely by designating a plurality of points on the image of the object.

The first and second aspects of the present invention can be expressed generally as follows:

Specifically, a shading correction method according to the present invention comprises the steps of imaging an object using an image pick-up device to obtain image data representing the object, displaying the image of the object represented by the image data on a display unit, creating a shading pattern by two-dimensionally expanding, across the area of the image of the object, a density-level distribution represented by a set of image data of a location designated by an operator on the image displayed by the display unit, and performing a shading correction of the image data, which represents the object imaged by the image pick-up device, using the shading pattern.

A shading correction apparatus according to the present invention comprises an image pick-up device for imaging a columnar object and outputting image data representing the object, a display unit for displaying the image represented by the image data outputted by the image pick-up device, input means for designating, on the image displayed by the display unit, a sample location for creating a shading pattern, means for creating a two-dimensional shading pattern by two-dimensionally expanding, across the area of the image of the object, a density distribution represented by a set of image data of a location designated by an operator on the image displayed by the input unit, and means for performing a shading correction of the image data, which represents the object imaged by the image pick-up device, using the shading pattern created.

The shading correction method and apparatus according to the present invention are premised upon the fact that the image of an object possesses a density (light-and-darkness) level distribution, which is substantially uniform in one direction of the image, owing to the solid shape of the object. A two-dimensional shading pattern having this density distribution that is uniform in one direction is created by expanding, in this one direction, the density-level distribution represented by the set of image data of the sample location that has been designated.

A third aspect of the present invention provides a method and apparatus capable of performing an accurate shading correction even if a position of an object, with respect to a reference position that prevails when a reference image serving as the basis of shading-pattern creation is captured, shifts when an object that is to undergo recognition processing or the like is imaged.

A shading correction method according to the third aspect of the present invention comprises the steps of creating a shading pattern based upon reference-image data representing a reference image obtained by imaging an object, detecting an amount of positional offset between the reference image and a target image obtained by imaging a target object, positionally correcting one of the shading pattern and the target image in dependence upon the amount of positional offset detected, and performing a shading correction of the target image using one of the positionally corrected shading pattern and target image as well as whichever of these has not been positionally corrected.

In an embodiment of the third aspect of the invention, the amount of positional offset is represented by at least one of linear displacement and rotation of the target image relative to the reference image.

Creation of the shading pattern based upon the reference-image data can be executed in accordance with the first or second aspect of the present invention described above.

The shading correction method according to the third aspect of the present invention is capable of being executed by computer software. A shading correction method according to the third aspect of the invention suitable for execution by software comprises the steps of detecting an amount of positional offset of a given target image to a reference image, positionally correcting one of a shading pattern, which has been created based upon the reference image, and the target image in dependence upon the amount of positional offset detected, and performing a shading correction of the target image using one of the positionally corrected shading pattern and target image as well as whichever of these has not been positionally corrected.

A shading correction apparatus according to the third aspect of the present invention comprises first memory means for storing reference-image data representing a reference image obtained by imaging an object, second memory means for storing data representing a shading pattern regarding the reference image, positional-offset detecting means for detecting an amount of positional offset between the reference image and a target image obtained by imaging a target object, positional-offset correcting means for positionally correcting one of the shading pattern and the target image in dependence upon the amount of positional offset detected by the positional-offset detecting means, and shading correction means for performing a shading correction of the target image using one of the shading pattern and target image positionally corrected by the positional-offset correcting means, as well as whichever of these has not been positionally corrected.

In a preferred embodiment of the third aspect of the present invention, the shading correction apparatus is further provided with image pick-up means for imaging the object and outputting image data representing the image of the object imaged.

The shading correction apparatus further comprises shading-pattern creating means for creating the shading-pattern data based upon the reference-image data that has been stored in the first memory means.

The shading-pattern creating means is capable of being implemented by the shading creating apparatus included in the first or second aspect of the present invention.

In accordance with the third aspect of the present invention, if the position of the target object shifts from the reference position, the amount of this positional offset is detected and either the target image or the shading pattern is corrected in dependence upon the amount of positional offset detected. As a result, an accurate shading correction is possible at all times.

BRIEF DESCRIPTION OF THE DRAWINGS

FIGS. 1 through 8 illustrate a first embodiment, in which:

FIG. 1 is a block diagram illustrating the overall configuration of an image processing system that executes shading correction processing;

FIG. 2 is a perspective view showing an object;

FIG. 3 illustrates an image obtained by imaging the object;

FIG. 4 is a graph illustrating a density-level distribution along line A—A in FIG. 3;

FIG. 5 is a graph illustrating a density-level distribution along line B—B in FIG. 3;

FIG. 6 illustrates a generated shading pattern;

FIG. 7 which illustrates data obtained by binarizing image data that has been subjected to processing for shading correction, represents data along line A—A in FIG. 3; and FIG. 8 is a flowchart illustrating the flow of processing in an image processing system;

FIGS. 9 through 14 illustrate a second embodiment, in which:

FIG. 9 illustrates an image obtained by imaging an object;

FIG. 10 is a graph illustrating a density-level distribution along line C—C in FIG. 9;

FIG. 11 is a graph illustrating a density-level distribution, on the X axis, of designated points;

FIG. 12 is a graph illustrating a density-level distribution obtained by interpolating the distribution of FIG. 11;

FIG. 13 is a graph representing data along line C—C in FIG. 9, this being image data that has been subjected to processing for shading correction; and FIG. 14 is a flowchart illustrating the flow of processing in an image processing system;

FIGS. 15 through 23 illustrate a third embodiment, in which:

FIG. 15 is a block diagram illustrating the configuration of an image processing system;

FIG. 16 illustrates the flow of shading correction processing in the image processing system;

FIG. 17 illustrates an example of a reference image;

FIG. 18 illustrates a generated shading pattern;

FIG. 19 illustrates the operator of a Sobel;

FIGS. 20 and 21 illustrate processing for obtaining a reference point in a reference image and target image; and FIGS. 22 and 23 illustrate processing for obtaining an angle of rotation of the target image relative to the reference image.

BEST MODE FOR CARRYING OUT THE INVENTION

Though the present invention is applicable to a color image, the following description will be premised on a monochromatic (black-and-white, gray) image in order to simplify the description. The image data is represented by gray level (density value or density level) except in cases where the image data is binarized.

Figure 1:
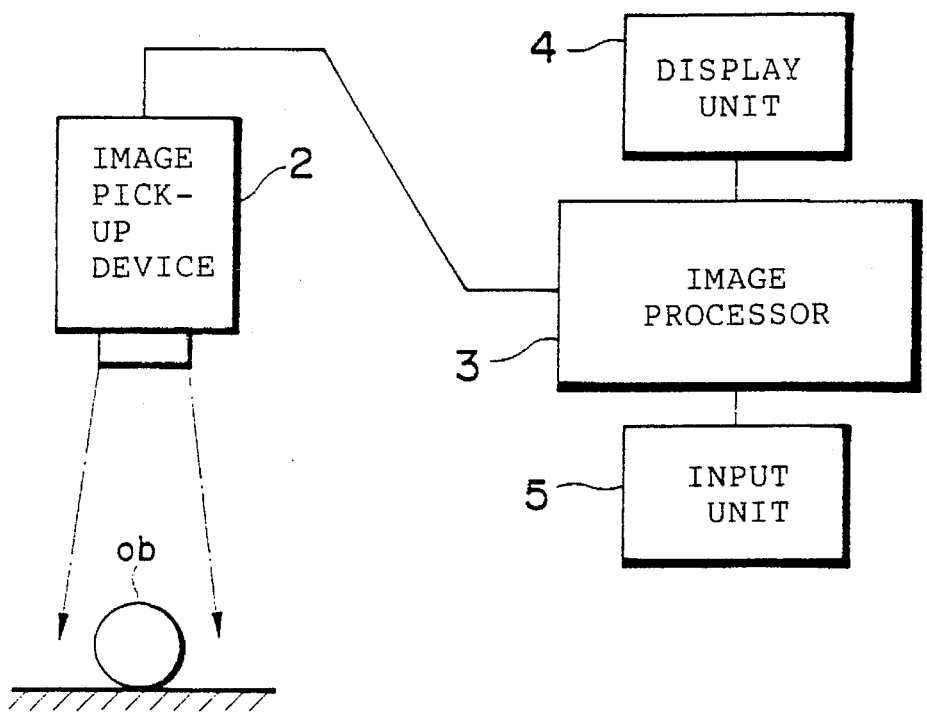

FIG. 1 illustrates the overall configuration of an image processing system for realizing the shading correction method of the present invention. This image processing system can be considered to have the shading correction apparatus of this invention incorporated within it.

A first embodiment will now be described.

Figure 2:
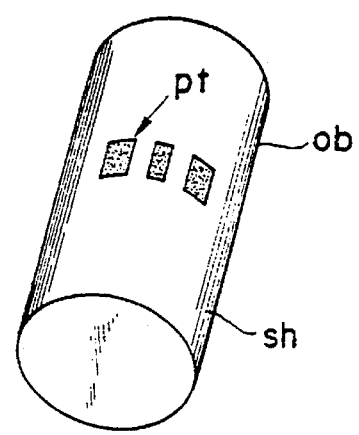

As shown in FIG. 2, the image processing system is for imaging a cylindrical object ob, such as a jar or can, and recognizing a character or figure (hereinafter referred to as a "recognition pattern") pt represented on the surface of the object ob. A ring-shaped lighting device (not shown) is disposed about an image pick-up device 2, whereby the object ob is lighted from above. Though the peripheral surface of the object ob facing the image pick-up device 2 is brightly illuminated, the two side surfaces of the object ob are relatively dark as seen from the image pick-up device 2 (these dark portions will be referred to as "shadows" sh hereinafter). The distribution of the brightness of the object surface as seen from the image pick-up device 2 varies transversely of the object ob but is substantially uniform in the longitudinal direction of the object.

The image processing system has the image pick-up device 2, an image processor 3 for subjecting image data, which has been obtained from the image pick-up device 2, to image processing in a manner described later, a display unit 4 for displaying a gray-level image or a binary image, and an input unit 5 for entering various data to the image processor 3 and designating a line that indicates a position for generating a shading pattern, described later.

The image pick-up device 2 includes a CCD camera, and A/D converter, etc. A video signal outputted by the CCD camera is converted into digital image data, which is then applied to the image processor 3. The image processor 3 is constituted by a computer and is equipped with a CPU (preferably a microprocessor) and a plurality of image memories for storing the gray image and the shading-pattern data. The CPU executes processing for creating shading patterns, processing for applying a shading correction to gray image data and other image processing. The display unit 4 includes a D/A converter for converting the image data provided by the image processor 3 into an analog video signal and displaying the same on a CRT or liquid-crystal display, etc. The input unit 5 includes a keyboard, a mouse, etc.

Figure 3:
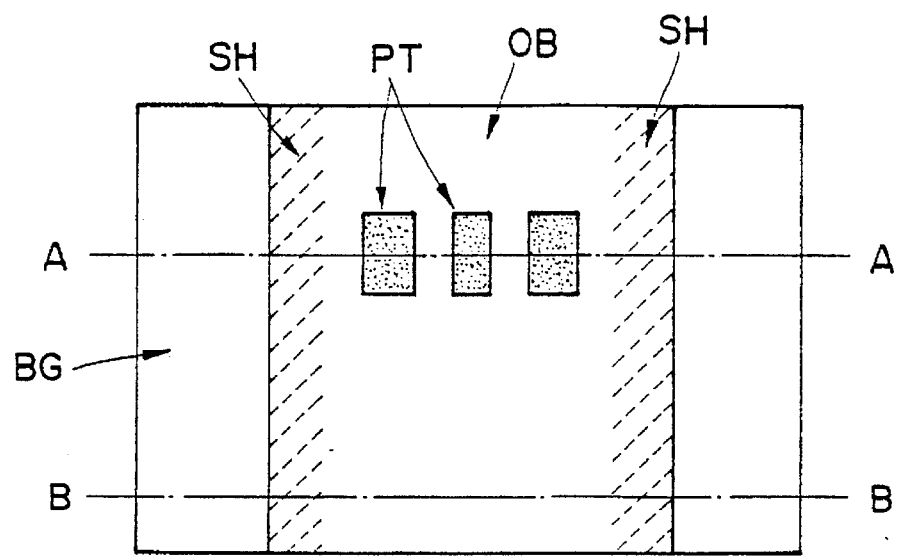

FIG. 3 illustrates an example of a picture represented by the gray-level image data obtained by imaging the object ob using the image pick-up device 2. The picture is displayed on the display unit 4. An image OB of part of the object ob is represented on an image BG of the background. Images PT of the recognition pattern pt represented on the surface of the object ob also appear. Images SH of the shadows sh produced owing to the fact that the object ob is a solid shape appear darker than the surroundings. The vertical direction in FIG. 3 corresponds to the longitudinal (height) direction of the cylindrical object ob. The images SH of the shadows extend in a band shape along the two sides of the image OB of the object.

Figure 4:
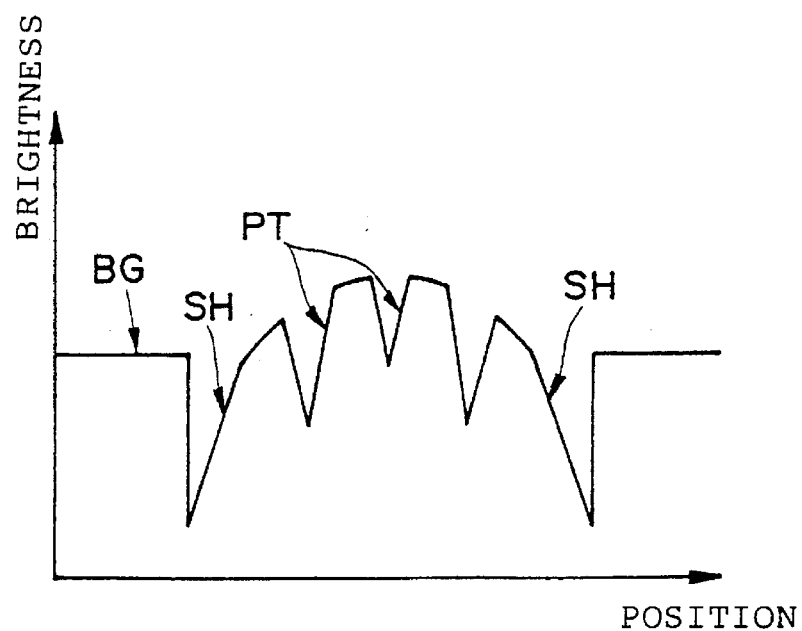

FIG. 4 illustrates the density-level distribution along line A—A of the picture shown in FIG. 3. The horizontal axis represents the position along the line A—A, and the vertical axis represents the density level, namely image brightness. The portions whose density levels represent the background image BG, shadow images SH and recognition-pattern images PT in FIG. 3 also are indicated using the same characters BG, SH and PT in FIG. 4. The line A—A cuts across the location at which the recognition pattern pt exists, and a variation in the density level due to the pattern pt appears on the density-level distribution of FIG. 4 as well. The density level of the image OB of the object is high (bright) at the central portion and low (dark) at both sides.

Figure 5:
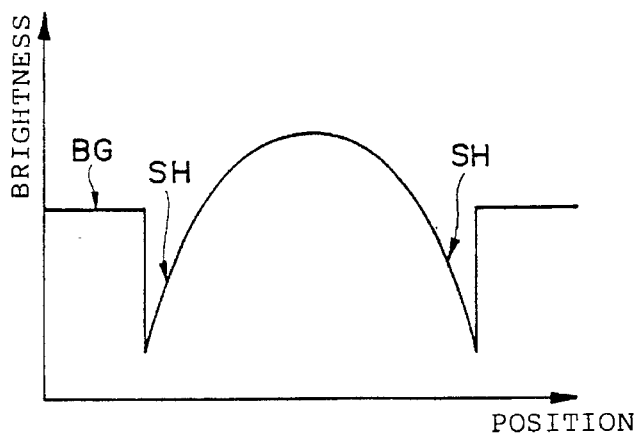

FIG. 5 illustrates the density-level distribution along line B—B of the picture shown in FIG. 3. The line B—B cuts across a location at which the recognition pattern pt is absent. Accordingly, this density-level distribution indicates the distribution of brightness on the surface of the object ob. The image OB of the object ob is brightest at the central portion and becomes darker as both sides are approached. The portions on both sides result from the images SH of the shadows. A change in density level due to the recognition pattern pt naturally does not appear.

Figure 8:
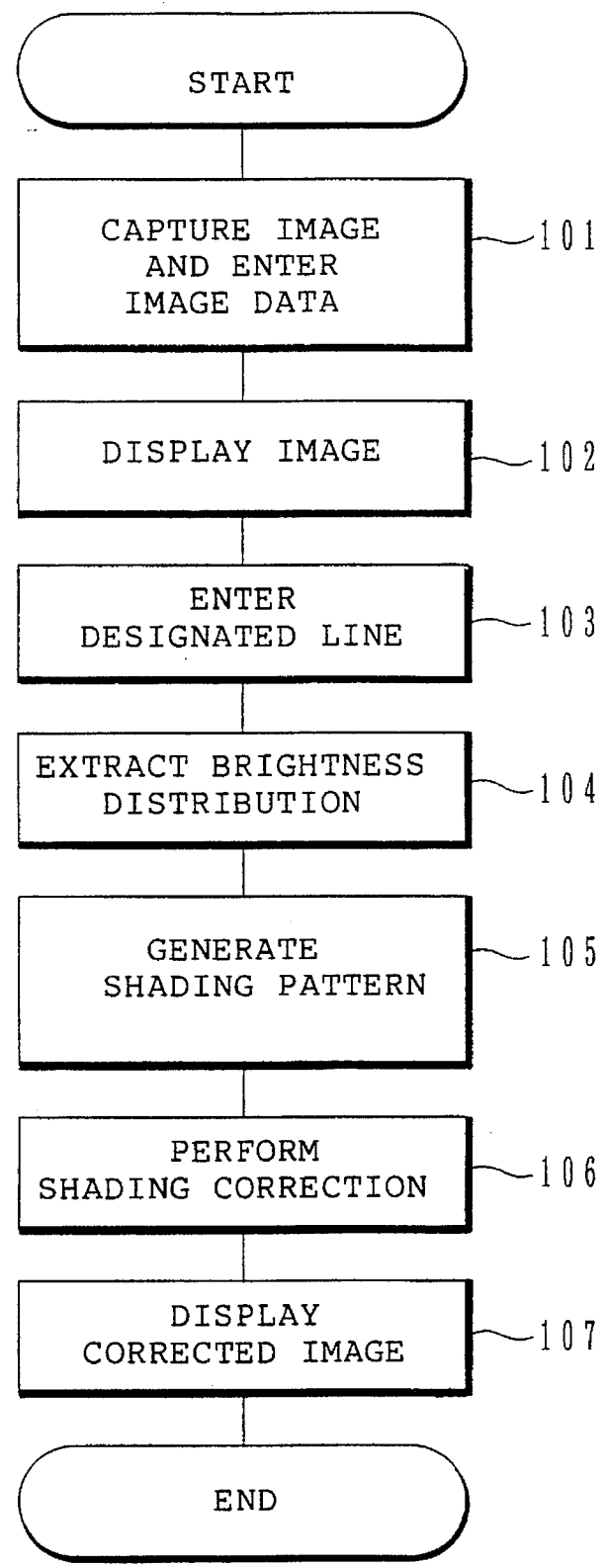

FIG. 8 illustrates the operation of the image processing system, and mainly a procedure for shading correction processing executed by the CPU of the image processor 3.

The object ob is imaged by the image pick-up device 2, the image data representing the object ob is outputted by the image pick-up device 2, and the image data is accepted by the image processor 3 and stored in the image memory (step 101). This image data is applied to the display unit 4 so that a picture of the kind shown in FIG. 3 is displayed (step 102).

The operator designates the horizontal line B—B, which perpendicularly intersects the longitudinal direction of the object ob, on the picture displayed on the display unit 4 (step 103). The horizontal line is displayed on the screen of the display unit 4 and the operator determines the height position of the line using the mouse or keyboard of the input unit 5, whereby the line B—B is entered. The line B—B is set on the displayed picture at a location that the operator has determined to be one where the images PT of the recognition pattern pt are not present and the density level is uniform in the vertical direction (the density level varies in the transverse direction, as illustrated in FIG. 5).

The designated line B—B is accepted by the image processor 3, and image data of the portion along the designated line B—B is extracted from the image data that has been stored in the image memory (step 104). The density-level distribution represented by the extracted image data is illustrated in FIG. 5. If the amount of image data extracted is one pixel in the vertical direction, this will suffice. It does not matter whether or not this data includes the image data representing the background BG.

Figure 6:
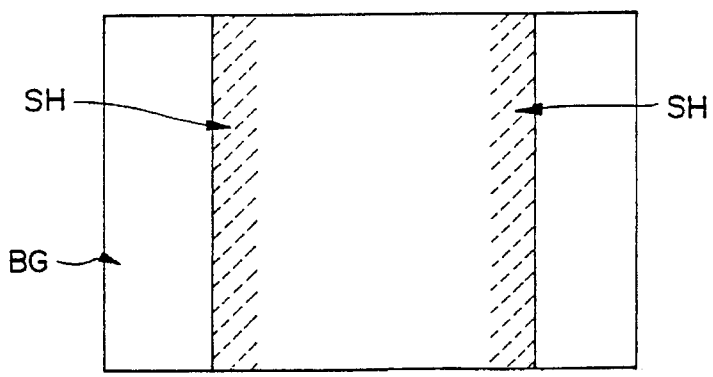

By arranging image data, which is completely identical with the image data representing the density distribution thus extracted, continuously along the vertical direction (the longitudinal direction), shading-pattern data is produced. This shading-pattern data is stored in the image memory (step 105). The shading pattern is obtained by expanding, in the vertical direction, the density-level distribution just as it exists along the line B—B. Thus the shading pattern represents a two-dimensional distribution of brightness on the surface (excluding the images PT of the recognition pattern) of the object ob. An example of this shading pattern is illustrated in FIG. 6. Since the distribution of brightness on the surface of the object ob may be considered to be substantially uniform longitudinally of the object ob with the exception of the portion having the recognition pattern pt, the shading pattern can be produced by simple processing of this kind.

A shading correction is performed by subtracting the shading-pattern data from the image data obtained as a result of imaging the object ob (step 106). The image data obtained by this shading correction processing also is stored in the image memory and is displayed on the display unit 4 (step 107).

Figure 7:
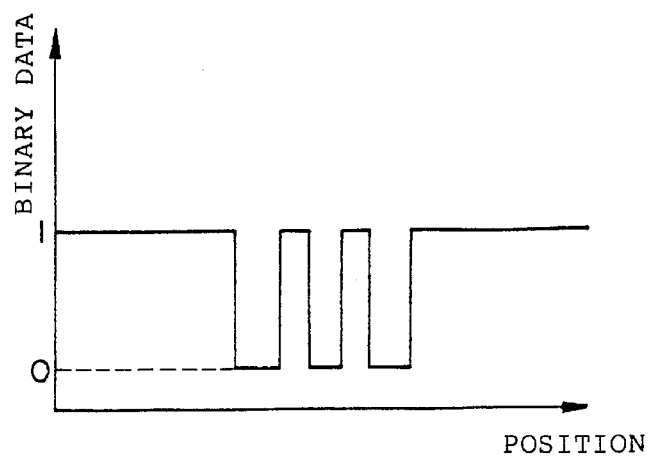

The image data obtained by the shading correction processing represents solely the recognition pattern pt. Such image data finally is binarized using an appropriate threshold level. Of this binarized image data, the image data along line A—A in FIG. 3 is shown in FIG. 7. Portions representing the recognition pattern pt are expressed by level 0, and other portions are expressed by level 1. Thus, by virtue of this shading correction processing, only the recognition pattern pt represented on the object ob appears in the image data, and the influence of the shadows sh is eliminated.

A second-embodiment of the invention will now be described. The configuration of the image processing system shown in FIG. 1 is applied also to the second embodiment as is.

In the first embodiment set forth above, the line B—B was set at the location devoid of the recognition pattern pt on the picture of the object ob. The second embodiment is particularly useful in a case where the line for producing the shading pattern cannot be set on a location where no recognition pattern is present.

Figure 9:
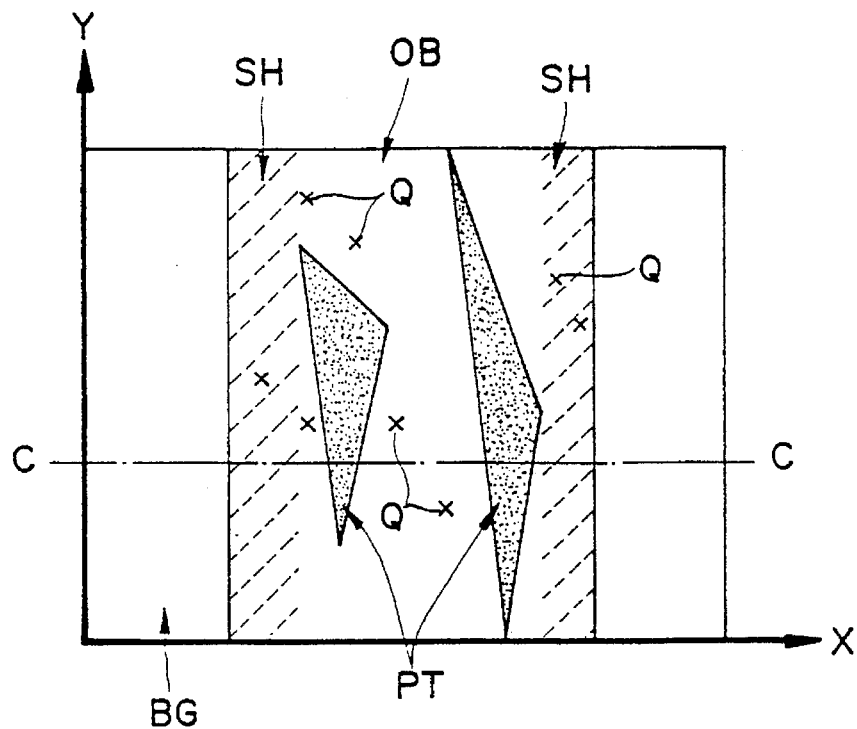

FIG. 9 illustrates another example of picture obtained by imaging the cylindrical object using the image pick-up device 2. Here the images PT of the recognition pattern appear across the entire vertical direction of the image. Regardless of how a line is designated in the transverse direction, the line always cuts across the images PT of the recognition pattern.

Let the horizontal direction of the picture be the X axis, and let the vertical direction be the Y axis.

Figure 10:
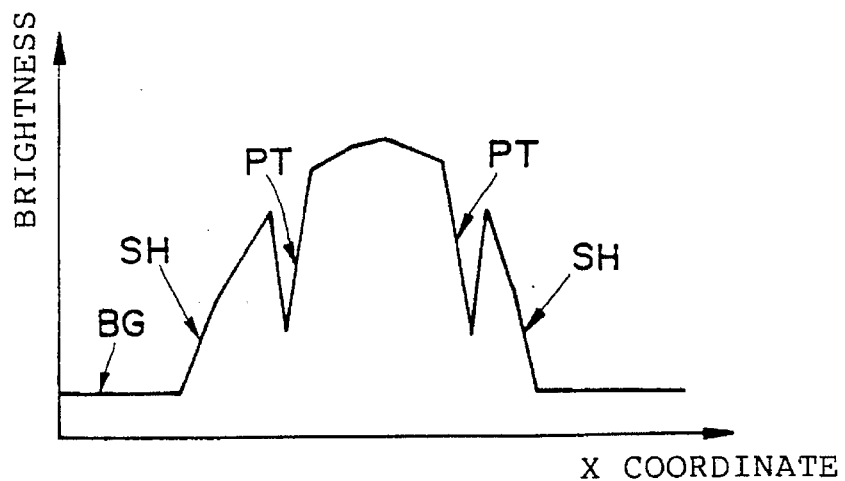

FIG. 10 illustrates a density-level distribution along line C—C drawn along the X axis of the image shown in FIG. 9. In this density-level distribution also, an X-axis brightness distribution on the surface of the object ob appears. The central portion is brightest and the picture grows darker as both sides are approached. Thus, the shadows sh have an influence. In this embodiment, the background is dark and the density level of the background image BG is low.

Figure 14:
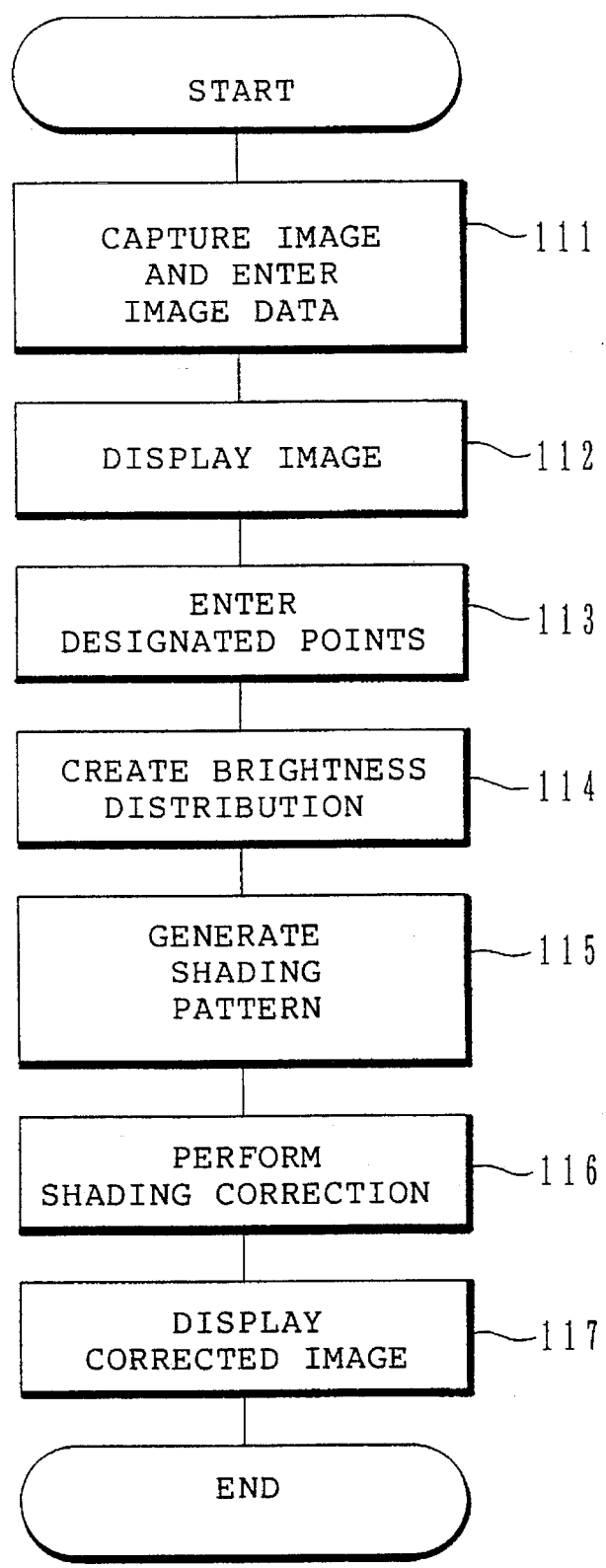

FIG. 14 illustrates the operation of the image processing system, and mainly a procedure for shading correction processing executed by the CPU of the image processor 3.

The image data representing the object ob imaged by the image pick-up device 2 is accepted by the image processor 3 and stored in the image memory (step 111). The picture shown in FIG. 9 represented by this image data is displayed on the display unit 4 (step 112).

Since a line B—B that does not cut across the images PT of the recognition pattern cannot be designated as in the first embodiment, the operator, rather than designating a line, designates representative points Q (arbitrary points are acceptable) on vertical lines (except at portions having the images PT of the recognition pattern) deemed to have a uniform brightness along the Y axis of the displayed picture and enters these points from the input unit 5 (step 113). It is desirable that the operator find as many of the vertical lines that seem to have uniform brightness along the Y axis as possible, and that the operator designate and enter as many of the points Q as possible. These points can be designated by moving a cursor on the display screen using the keyboard or mouse.

Figure 11:
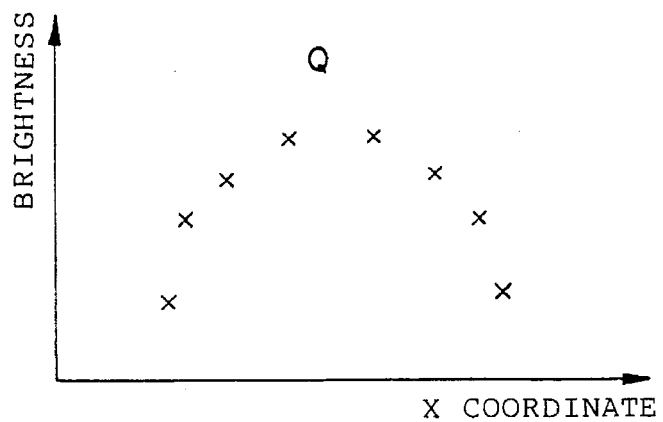

When a plurality of representative points on a plurality of vertical lines having uniform brightness along the entire vertical length of the image are designated, the X coordinate of each designated point is read and the image data of each designated point is read out of the image memory and these items of image data are arranged on the corresponding X coordinates, whereby a distribution of brightness along the X axis is created (step 114). FIG. 11 illustrates an example of the brightness distribution thus created.

Figure 12:
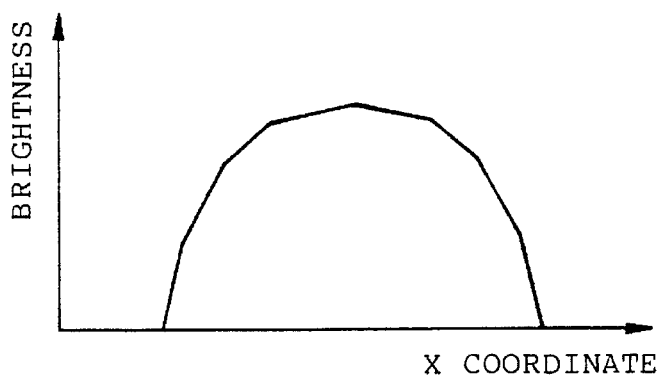

The distribution of brightness is interpolated using a well-known method of interpolation, such as the spline interpolation method, and the interpolated points are connected by continuous curves or straight lines. FIG. 12 illustrates the distribution of brightness after interpolation.

Each point Q is a point on a line along the X axis having a uniform distribution along the Y axis, as mentioned above. A shading pattern is created by arranging, continuously in the Y direction, the image data representing the distribution of brightness in the X direction shown in FIG. 12 (step 115). This shading pattern is stored in the image memory. The shading pattern is a two-dimensional density distribution obtained by expanding the distribution of FIG. 12 in the Y direction as is.

A shading correction is carried out by subtracting the created shading-pattern data from the image data captured by the image pick-up device 2, or by dividing this image data by the shading-pattern data (step 116). The image data obtained by this shading correction processing is stored in the image memory and is displayed on the display unit 4 (step 117).

Figure 13:
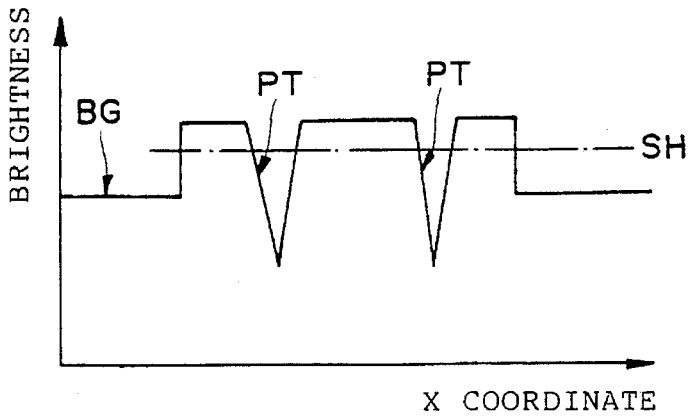

FIG. 13 illustrates the density-level distribution represented by the image data along line C—C of FIG. 9. This is the image data that has been subjected to the shading correction. By virtue of this shading processing, the influence of the brightness distribution containing the shadows sh on the surface of the object ob is eliminated and the variation in the density level that represents the images PT of the recognition pattern is clearly expressed. This image data is binarized as necessary using a threshold level SH.

In the two embodiments described above, an object having a columnar shape is illustrated as the object imaged. However, it goes without saying the invention is applicable also to an object having a prismatic shape (any shape whose cross section is quadrangular, triangular or hexagonal). Further, in a case where the thickness of the object differs in the longitudinal direction, the above-described shading correction can be applied to each portion of equal thickness.

Automatic recognition of characters or figures will be considered in a case where there are a plurality of objects and the solid shapes (e.g., columnar) of these objects are the same but the characters or figures described on the surfaces of the objects differ (though they may be the same). Since the solid shapes of the plurality of objects are the same, it will suffice to create one shading pattern beforehand. Each time a different object is imaged by the image pick-up device, the image data obtained by imaging can be subjected to a shading correction using the shading-pattern data created beforehand.

If the position of the object to be recognized within the visual field of the image pick-up device has shifted from the position of the object that prevailed when the shading pattern was created, the positions of the shadow portions in the image data of the object to be recognized and the position of the shading pattern also will shift in the image data. As a result, an accurate shading correction will no longer be carried out. Such a situation occurs often when the objects are fed successively in front of the image pick-up device.

A third embodiment relates to a method and apparatus capable of performing an accurate shading correction even if the position of an object to be recognized has shifted from the position of the object that served as the basis of shading-pattern creation in the visual field of the image pick-up device.

Figure 15:
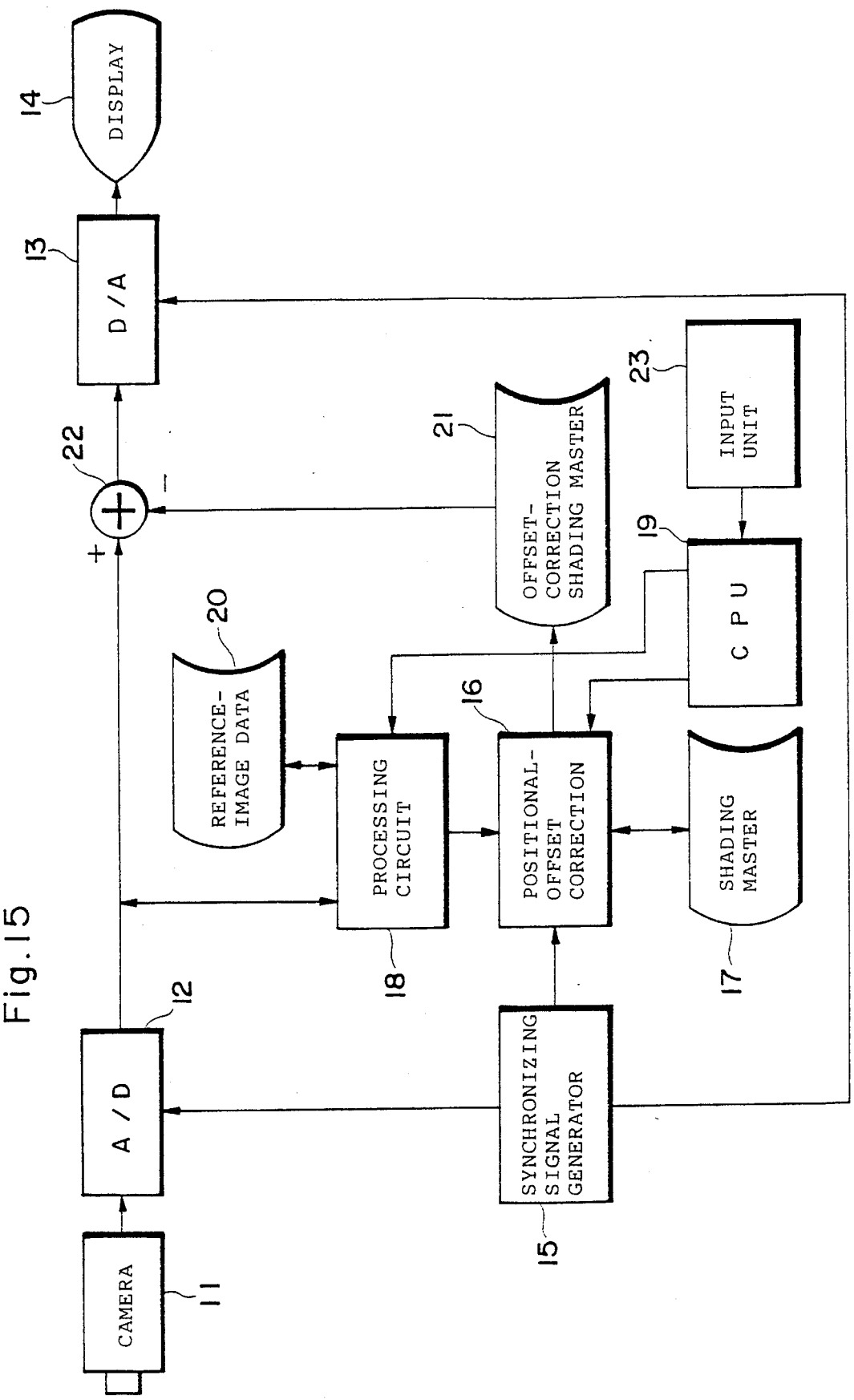

FIG. 15 is a block diagram illustrating the configuration of an image processing system that includes the shading correction apparatus according to the third embodiment.

A television camera 11 images an object and outputs a video signal representing the object. The video signal is converted into digital image data (gray-level image data) by an A/D converter 12 and the resulting image data is applied to a processing circuit 18 and to a subtracting circuit 22 for shading correction. The output image data from the subtracting circuit 22 is converted into an analog signal by a D/A converter 13 and the analog signal is applied to a display unit 14. The display unit 14 displays an image of the object imaged by the television camera 11 as well as a created shading pattern or an image resulting from the shading correction.

The processing circuit 18 generates the shading pattern, executes edge detection processing and binarization processing, etc. A positional-offset correcting circuit 16 calculates the amount of positional offset of the image of the object to be recognized relative to a reference image. A synchronizing signal generating circuit 15 applies various timing signals to the A/D converter 12, D/A converter 13 and positional-offset correcting circuit 16. A CPU 19 supervises the overall operation of image processing inclusive of shading correction processing. An input unit 23 is used by the operator to enter various commands, designate the position of a window, etc.

The image processing system has three image memories. These image memories are a reference-image memory 20 for storing a reference image, a shading master file 17 for storing shading-pattern data that has been created, and an offset-correction shading master file 21 for storing shading-pattern data that has been corrected for positional offset.

Figure 16:
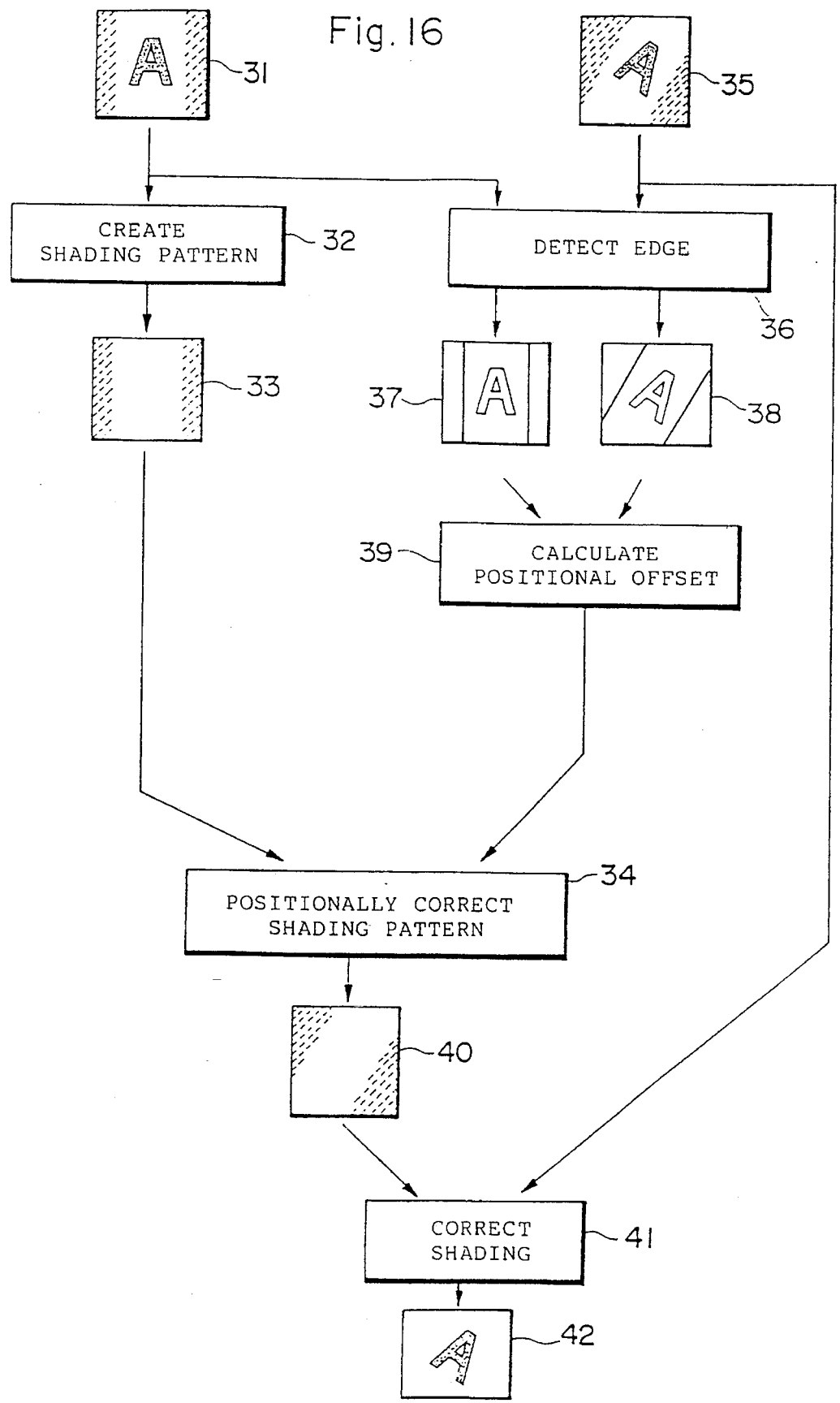

The operation of the image processing system roughly comprises pre-processing and shading correction processing. The pre-processing includes reference-image registration processing and shading-pattern registration processing. These processing procedures are illustrated in FIG. 16.

Reference-image registration processing will be described first.

One of a plurality of objects having the same solid shape is selected and photographed by the television camera 11. The image of this object is displayed on the display unit 14. The image data merely passes through the subtracting circuit 22 without being subjected to the subtraction (shading correction) processing.

Figure 17:
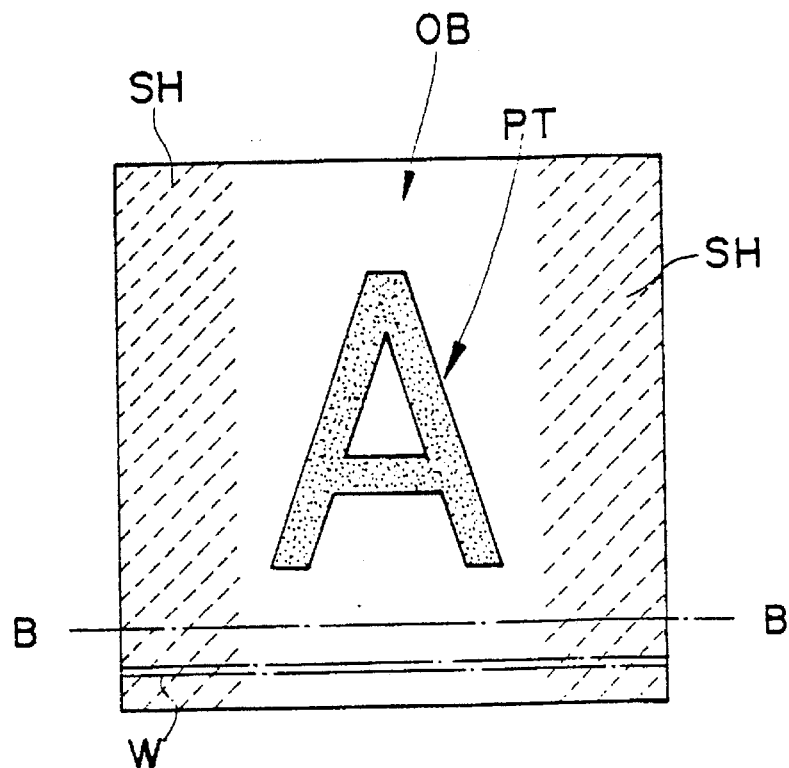

While observing the image displayed on the display unit 14, the operator adjusts the position of the object. When the object has been positioned at a prescribed location (a reference position) within the visual field of the camera 11, the operator enters a command from the input unit 23 to register the reference image. This command is applied to the CPU 19. The latter responds to this command by controlling the processing circuit 18 in such a manner that the image data representing the object entering the processing circuit 18 through the A/D converter 12 is stored in the reference-image memory 20 as reference-image data. As a result, the data representing the reference image is registered (see reference numeral 31 in FIG. 16). The above-mentioned reference position can be decided by the operator at will. In general, the position selected is such that the object will be at the center of the visual field of the camera 11 or such that one side of the object will be parallel to one side of the square visual field of the camera 11. An example of the registered reference image is illustrated in FIG. 17. Reference characters identical with those of the foregoing embodiments are used for the object, recognition pattern, shadows, etc. In this embodiment, the image PT of the recognition pattern is the character "A".

Figure 18:
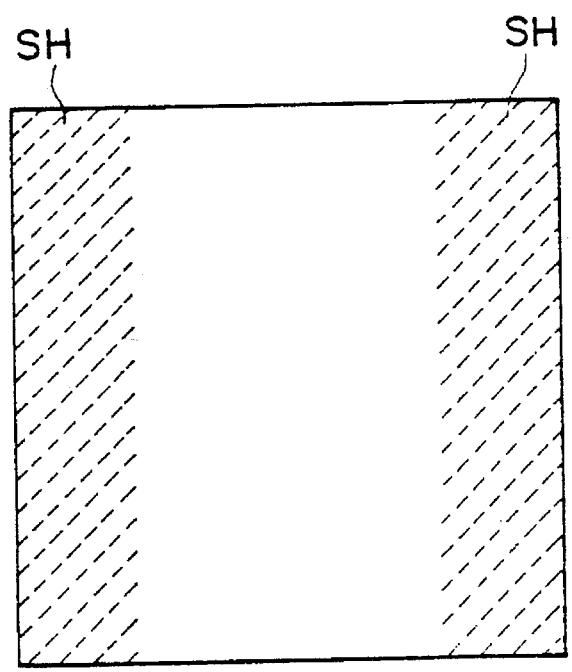

Next, the operator registers a shading pattern. The processing for creating the shading pattern is carried out in exactly the way as set forth above in the first or second embodiment. If the processing is executed in accordance with the first embodiment, a line B—B that perpendicularly intersects the longitudinal direction of the object is designated at a location where the image PT of the recognition pattern is absent, as shown in FIG. 17. The image data distribution along the line B—B is extracted from the reference-image data that has been stored in the reference-image memory 20 and the distribution is arranged continuously in memory along the longitudinal direction of the object, as a result of which a shading pattern of the kind shown in FIG. 18 is created (see reference numeral 32 in FIG. 16). The image data representing the shading pattern created is stored in the shading master file 17 (see reference numeral 33 in FIG. 16).

A method using a window W instead of the line B—B also is available. When the operator enters the command from the input unit 23 to register the shading pattern, the CPU 19 responds by controlling the processing circuit 18 so that the circuit 18 generates image data representing the window. The image data representing the window is applied to the display unit 14 via the subtracting circuit 22 and D/A converter 13 so that window W is displayed in a form superimposed on the reference image, as shown in FIG. 17 (the display of the line B—B is unnecessary). The window W, which has a transverse length large enough to include the portions of the shadows SH in the image of the object, perpendicularly intersects the longitudinal direction of the image of the object. Using the input unit 23, the operator moves the window W and positions it at a location where the recognition pattern PT is not present. Of the reference-image data that has been stored in the reference-image memory 20, the image data within the limits defined by the window W is read out and this data is stored in the shading master file 17. The image data within the limits of the window W is arranged, in the shading master file 17, longitudinally of the object in successive widths equivalent to the width of the window W. As a result, data representing the shading pattern shown in FIG. 18 is created and registered.

The above-described two processing operations for creating the shading pattern differ only in terms of whether the line B—B or the window W is used.

Next, a transition is made to shading correction processing.

The object to be recognized is placed within the range of the visual field of the camera 11. It does not matter if the position of this object is offset from the position of the object used to create the reference image described above. The image of this object is captured by the camera 11 and displayed on the display unit 14 (see reference numeral 35 in FIG. 16). If necessary, the image data obtained by imaging is stored in the image memory. It is assumed that the same recognition pattern (character "A") is represented also on the surface of this object.

Edge detection processing (inclusive of binarization processing) regarding the reference image stored in the reference-image memory 20 and the image of the object to be recognized (referred to hereinafter as the "target image"), which image has been captured by the camera 11, is executed by the processing circuit 18 (see reference numeral 36 in FIG. 16), and binarized edge images (differentiated images) are obtained (see reference numerals 37, 38 in FIG. 16).

The edge detection processing is carried out using the operator of a Sobel, by way of example. As shown in FIG. 19, it is assumed that a pixel $P_0$ is situated at the center, that pixels $P_1$, $P_2$ and $P_3$ are situated respectively at the upper left, directly above and at the upper right of the center pixel, that pixels $P_4$, $P_5$ are situated respectively at the left and right of the center pixel, and that pixels $P_6$, $P_7$ and $P_8$ are situated respectively at the lower left, directly below and at the lower right of the center pixel. The following operation is performed with regard to the center pixel $P_0$ to obtain a Sobel value:

$$\text{Sobel value } (P_0) = |(P_1 + 2P_2 + P_3) - (P_6 + 2P_7 + P_8)| + \quad (1)$$
$$|(P_1 + 2P_4 + P_6) - (P_3 + 2P_5 + P_8)|$$

The operation of Equation (1) is performed with regard to all pixels of the image of the object. The Sobel values obtained with regard to all pixels are binarized using an appropriate threshold value. As a result, edge images are obtained that are represented by one-bit data per pixel, in which data of a pixel representing an edge is 1 while data of other pixels is 0. These edge images are stored in the image memory of the processing circuit 18.

Next, the amount of positional offset of the target image relative to the reference image is calculated in the positional-offset correcting circuit 16 using the respective edge images of the reference image and target image thus obtained (see reference number 39 in FIG. 16).

The amount of positional offset is represented by amounts of movement along the X and Y axes and amount of rotation. Though the X and Y axes can be determined arbitrarily, it will suffice to employ axes parallel to the two perpendicular sides of the square visual field of the camera 11.

The amounts of movement in the X and Y directions are represented by distances in the X and Y directions between a reference point in the reference image and a reference point in the target image. In a case where the image PT of the recognition pattern is the same in the reference image and target image, reference points can be set on the images PT of these recognition patterns. For example, these reference points can be positions of the centers of gravity of the pattern images PT (the characters "A").

The positions of the centers of gravity serving as reference points can be obtained by setting windows $W_1$ and $W_2$ surrounding the characters "A", as shown in FIGS. 20 and 21, respectively, extracting the characters "A" within these windows and calculating the centers of gravity thereof. Let $X_1$, $Y_1$ represent the coordinate system of the reference image, and let $X_2$, $Y_2$ represent the coordinate system of the target image. Let a reference point (position of the center of gravity) $P_{1W}$ of the reference image be expressed in the $X_1$, $Y_1$ coordinate system and denoted by $(x_{1r}, y_{1r})$, and let a reference point (position of the center of gravity) $P_{2W}$ of the target image be expressed in the $X_2$, $Y_2$ coordinate system and denoted by $(x_{2r}, y_{2r})$.

In a case where the images PT of the recognition patterns are different in the reference image and target image, it will suffice to adopt any other points in the images as reference points (for example, the position of the center point or the position of a specific mark added to the object).

The amount of rotation can be obtained as the angle of inclination of a straight line appearing in the edge image of the target image with respect to the corresponding straight line appearing in the image of the reference image. For example, the straight lines representing the boundaries of the shadows may be used as these straight lines.

As shown in FIG. 22, windows $W_a$, $W_b$ are set at any two positions astride the edge of a shadow in the edge image of the reference image, and the centers of gravity a $(x_a, y_a)$, b $(x_b, y_b)$ of the image data within the windows $W_a$, $W_b$ are obtained. Since the image data is such that the edge is represented by 1 and other portions by 0, the centers of gravity a, b are always on the edge of the shadow.

Similarly, as shown in FIG. 23, windows $W_c$, $W_d$ are set at any two positions so as to include the edge of the shadow in the target image, and the centers of gravity c $(x_c, y_c)$, d $(x_d, y_d)$ of the image data within the windows $W_c$, $W_d$ are obtained. These centers of gravity c, d also are always on the edge of the shadow.

The angle of inclination of the straight line cd relative to the straight line ab (the angle of rotation of the edge image of the target image relative to the edge image of the reference image) is expressed by the following equation:

$$\theta = \cos^{-1}[\{(x_a - x_b)(x_c - x_d) + (y_a - y_b) \quad (2)$$
$$(y_c - y_d)\}/[\{(x_a - x_b)^2 + (y_b - y_b)^2\}^{1/2}$$
$$\{(x_c - x_d)^2 + (y_c - y_d)^2\}^{1/2}]]$$

When the amount of positional offset is thus obtained, the positional-offset correcting circuit 16 reads out shading-pattern data, which has been stored in the shading master file 17, using an address converted in dependence upon the amount of positional offset obtained, and writes this shading-pattern data in the offset-correction shading master file 21 (see reference number 34 in FIG. 16). As a result of this processing, shading-pattern data suitable for a shading correction of the target image having the positional offset relative to the reference image is stored in the offset-correction shading master file 21 (see reference number 40 in FIG. 16).

Address conversion of the two files 21 and 17 is performed as set forth below. This has been proposed by the Applicant in Japanese Patent Application No. 2-157186.

A point $(x_1, y_1)$ in the coordinate system $X_1$, $Y_1$ of the the reference image and the corresponding point (x2, y2) in the coordinate system X2, Y2 of the target image are related by the following equation using the above-mentioned coordinates (x1r,y1r), (x2r,y2r) of the reference points and the rotational angle $\theta$.

$$\begin{bmatrix} x^2 \\ y^2 \end{bmatrix} = \begin{bmatrix} \cos\theta & -\sin\theta & x_{2r} \\ \sin\theta & \cos\theta & y_{2r} \end{bmatrix} \begin{bmatrix} x_1 - x_{1r} \\ y_1 - y_{1r} \\ 1 \end{bmatrix} \quad (3)$$

Solving Equation (3) for x1, y1 gives the following equations:

$$x_1 = \cos\theta \cdot x_2 + \sin\theta \cdot y_2 + \alpha \quad (4)$$
$$y_1 = -\sin\theta \cdot x_2 + \cos\theta \cdot y_2 + \beta \quad (5)$$
$$\alpha = x_{1r} - \cos\theta \cdot x_{2r} - \sin\theta \cdot y_{2r} \quad (6)$$
$$\beta = y_{1r} + \sin\theta \cdot x_{2r} - \cos\theta \cdot y_{2r} \quad (7)$$

The address of the offset-correction shading master file 21 corresponds to the coordinates $(x_2, y_2)$, and the address of the shading master filter 17 corresponds to the coordinates $(x_1, y_1)$. Therefore, the write address of the offset-correction shading master file 21 can be converted to the read address of the shading master file by Equations (4) through (7).

The shading-pattern data that has been corrected for the positional offset is subtracted from the image data of the target image by the subtracting circuit 22 (see reference number 41 in FIG. 16) and the image that has been subjected to the shading correction (see reference numeral 42 in FIG. 16) is displayed on the display unit 14.

In the foregoing description, the positional offset of the shading pattern is corrected. However, it goes without saying that an arrangement may be adopted in which the positional offset of the target image is corrected.

Furthermore, the functions of the processing circuit 18, positional-offset correcting circuit 16 and subtracting circuit 22 in FIG. 15 can be implemented by software.

In the three embodiments described above, gray-level image data is subjected to processing. However, the invention is applicable also to a color image. Since the color-image data can be separated into R (red), B (blue) and G (green) image data or Y, R-Y and B-Y image data, in which Y serves as luminance data, it will suffice to perform the above-described creation of shading patterns and the shading correction for each of these items of image data.

Industrial Applicability

The method and apparatus for shading correction according to the present invention is useful in correctly judging characters, figures and the like in a system that images objects and recognizes characters, figures and the like represented on the objects.

What is claimed is:

1. A shading correction method comprising the steps of:
   imaging a columnar object using an image pick-up device to obtain image data representing the object;
   displaying the image represented by said image data on a display unit;
   designating a line on said image displayed by said display unit in a direction perpendicular to a longitudinal direction of said object;
   said designated line being one where there are no images, defects or other noisy images present and where a density level is uniform along said longitudinal direction on said line;
   extracting the image data along the designated line to form a density level distribution;
   repeatedly arranging the same said density level distribution in said longitudinal direction to form shading pattern data representing the distribution of brightness on the surface of the object in two dimensions; and
   performing a shading correction of the image data presenting the object by using said shading-pattern data.

2. A method of creating a shading pattern, comprising the steps of:

imaging a columnar object using an image pick-up device to obtain image data representing the object;

displaying the image represented by said image data on a display unit;

designating a line on said image displayed by said display unit in a direction perpendicular to a longitudinal direction of said object;

said designated line being one where there are no images, defects or other noisy images present and where a density level is uniform along said longitudinal direction on said line;

extracting the image data along the designated line to form a density level distribution;

repeatedly arranging the same said density level distribution in said longitudinal direction to form shading pattern data representing the distribution of brightness on the surface of the object in two dimensions.

3. A shading correction method comprising the steps of:

imaging a columnar object using an image pick-up device to obtain image data representing the object;

displaying the image represented by said image data on a display unit;

designating a plurality of representative points on said image displayed by said display unit;

said designated plurality of points being points which have uniform density levels in the vertical direction across the entire length of the object and which are located at portions having images, defects or other noisy images;

extracting the image data along the designated points in the horizontal direction to form a density level distribution;

repeatedly arranging the same density level distribution in said longitudinal direction to form shading pattern data representing the distribution of brightness on the surface of the object in two dimensions; and performing a shading correction of the image data representing the object by using said shading-pattern data.

4. A method of creating a shading pattern, comprising the steps of:

imaging a columnar object using an image pick-up device to obtain image data representing the object;

displaying the image represented by said image data on a display unit;

designating a plurality of representative points on said image displayed by said display unit;

said designated plurality of points being points which have uniform density levels in the vertical direction across the entire length of the object and which are located at portions having images, defects or other noisy images; and extracting the image along the designated points in the horizontal direction to form a density level distribution; and repeatedly arranging the same density level distribution in said longitudinal direction to form shading pattern data representing the distribution of brightness on the surface of the object in two dimensions.

5. A shading correction method according to claim 1, wherein said sample location is designated by the position of a line drawn on said image.

6. A shading correction method according to claim 1, wherein said sample location is designated by a slender window displayed on said image.

7. A shading correction method according to claim 1, wherein an operator performs said designation.

8. A method of creating a shading pattern according to claim 2, wherein an operator performs said designation.

9. A shading correction method according to claim 3, wherein an operator performs said designation.

10. A method of creating a shading pattern according to claim 4, wherein an operator performs said designation.

* * * * *